US011772497B2

(12) United States Patent
Kim et al.

(10) Patent No.: US 11,772,497 B2
(45) Date of Patent: Oct. 3, 2023

(54) VEHICLE AND BATTERY PACK FOR THE SAME

(71) Applicant: Samsung SDI Co., Ltd., Yongin-si (KR)

(72) Inventors: Dolores Kim, Yongin-si (KR); Byeongseon Min, Yongin-si (KR); Joonwoo Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 127 days.

(21) Appl. No.: 17/172,954

(22) Filed: Feb. 10, 2021

(65) Prior Publication Data

US 2021/0276429 A1    Sep. 9, 2021

(30) Foreign Application Priority Data

Mar. 4, 2020    (KR) .................... 10-2020-0027215

(51) Int. Cl.
*B60L 15/08*    (2006.01)
*B60L 50/60*    (2019.01)
*B60L 58/10*    (2019.01)
*H02J 7/00*    (2006.01)

(52) U.S. Cl.
CPC ............ *B60L 15/08* (2013.01); *B60L 50/60* (2019.02); *B60L 58/10* (2019.02); *H02J 7/007* (2013.01)

(58) Field of Classification Search
CPC .. B60L 3/04; B60L 15/08; B60L 50/60; B60L 58/10; H01H 35/14; H02J 7/007
See application file for complete search history.

(56) References Cited

U.S. PATENT DOCUMENTS

| 7,690,458 B2 | 4/2010 | Ueda |
| 10,748,718 B2 | 8/2020 | Koch et al. |

FOREIGN PATENT DOCUMENTS

| CN | 106004454 B | 9/2018 |
| JP | 2012-065503 A | 3/2012 |
| JP | 2018010866 A | 1/2018 |
| JP | 2018-057127 A | 4/2018 |
| JP | 2018057127 A * | 4/2018 |
| KR | 10-0746066 B1 | 8/2007 |
| KR | 10-0877965 B1 | 1/2009 |

(Continued)

OTHER PUBLICATIONS

Comeau, et al., "Comparison of Crash Pulse Data from Motor Vehicle Event Data Recorders and Laboratory Instrumentation", Proceedings of the Canadian Multidisciplinary Road Safety Conference XIV; Jun. 27-30, 2004; Ottawa, Ontario, 17 pages.

(Continued)

*Primary Examiner* — Said Bouziane
(74) *Attorney, Agent, or Firm* — Lewis Roca Rothgerber Christie LLP (57) ABSTRACT

A vehicle includes: a battery; an electric motor to be actuated by electric energy stored in the battery; a switch coupled between the battery and the electric motor; an inertial sensor configured to output an acceleration signal; a controller configured to output a pulse width modulation (PWM) signal having a duty ratio according to an acceleration magnitude of the acceleration signal; and a switch driving circuit configured to generate a control current for controlling the switch based on the PWM signal.

12 Claims, 7 Drawing Sheets

(56) References Cited

FOREIGN PATENT DOCUMENTS

KR          100877965 B1 *   1/2009
KR        10-1206783 B1    11/2012

OTHER PUBLICATIONS

Search Report issued in related European Patent Application No. 21159783.6, dated Jul. 20, 2021, 11 pages.
Notice of Allowance issued in related European Patent Application No. 21159783.6, dated Feb. 14, 2023, 77 pages.

\* cited by examiner

VEHICLE AND BATTERY PACK FOR THE SAME

CROSS-REFERENCE TO RELATED APPLICATION

This application claims priority to and the benefit of Korean Patent Application No. 10-2020-0027215, filed on Mar. 4, 2020, the entire content of which is hereby incorporated by reference.

BACKGROUND

1. Field

One or more embodiments of the present disclosure relate to a vehicle and a battery pack for the same.

2. Description of Related Art

Eco-friendly vehicles such as electric vehicles and hybrid electric vehicles include a motor and a high-voltage battery that supplies electric energy required for the motor. In the event of a vehicle collision, damage such as damage caused by a fire, or the risk of fire, may increase due to damage to the high-voltage battery and electrical components connected thereto.

A battery management system blocks a relay in order to prevent or reduce an increase in accident damage in the event of a vehicle collision. When a collision occurs, an occupant restraint component (ORC) detects the collision and transmits a collision signal to the battery management system, and the battery management system may block the relay in response to the collision signal.

However, it takes some time for the relay to actually open, and thus, to be blocked. In general, in the case of controlling the relay on the basis of the duty value (duty ratio) of a pulse width modulation (PWM) signal, even though the duty value (duty ratio) is suddenly reduced to 0%, it takes about 10 to 30 ms for the relay to actually open. Although this is only a short period of time, electrical sparks generated during this time may cause fires. Thus, efforts for reducing the time in which the relay is actually opened to the maximum are required.

SUMMARY

One or more embodiments are directed towards a vehicle including a battery pack that may reduce the time required for a relay to open to the maximum, and a method of controlling the vehicle.

According to one or more embodiments, a vehicle includes a battery, an electric motor to be actuated (e.g., operated or caused to be operated) by electric energy stored in the battery, a switch coupled (e.g., connected) between the battery and the electric motor, an inertial sensor configured to output an acceleration signal, a controller configured to output a pulse width modulation (PWM) signal having a duty ratio adjusted according to an acceleration magnitude of the acceleration signal, and a switch driving circuit configured to generate a control current for controlling the switch based on the PWM signal.

The controller may be configured to output a PWM signal having a set or preset first duty ratio to the switch driving circuit when the acceleration magnitude is greater than or equal to a first threshold value and less than a second threshold value that is greater than the first threshold value. The first duty ratio may be greater than a minimum duty ratio for maintaining the switch in a closed state and less than 100% duty ratio.

The controller may be configured to output a PWM signal having a duty ratio of 100% to the switch driving circuit to close the switch when the acceleration magnitude is less than the first threshold value, and the controller may be configured to output a PWM signal having a duty ratio of 0% to open the switch when the acceleration magnitude is greater than or equal to the second threshold value.

The vehicle may further include a collision sensor configured to output a collision signal when a collision is detected. The controller may be configured to output a PWM signal having a duty ratio of 0% to the switch driving circuit in response to receiving the collision signal.

The controller may be configured to output a PWM signal having a duty ratio monotonically decreasing according to the acceleration magnitude and in a duty ratio range between a minimum duty ratio for maintaining the switch in a closed state and 100% duty ratio when the acceleration magnitude is less than the first threshold value.

The acceleration signal may include a longitudinal acceleration signal and a lateral acceleration signal. The controller may be configured to output a PWM signal having the first duty ratio to the switch driving circuit when at least one selected from a longitudinal acceleration magnitude of the longitudinal acceleration signal and a lateral acceleration magnitude of the lateral acceleration signal is greater than or equal to the first threshold value and less than the second threshold value.

According to one or more embodiments, a battery pack for a vehicle includes a battery, a switch coupled (e.g., connected) between the battery and an external terminal, a battery controller configured to output a pulse width modulation (PWM) signal having a duty ratio according to an acceleration magnitude, and a switch driving circuit configured to generate a control current for controlling the switch based on the PWM signal.

The battery controller may be configured to output a PWM signal having a set or preset first duty ratio to the switch driving circuit when the acceleration magnitude is greater than or equal to a first threshold value and is less than a second threshold value that is greater than the first threshold value. The first duty ratio may be greater than a minimum duty ratio for maintaining the switch in a closed state and less than 100% duty ratio.

The battery controller may be configured to output a PWM signal having a duty ratio of 100% to the switch driving circuit to close the switch when the acceleration magnitude is less than the first threshold value, and the battery controller may be configured to output a PWM signal having a duty ratio of 0% to open the switch when the acceleration magnitude is greater than or equal to the second threshold value.

The battery controller may be configured to output a PWM signal having a duty ratio of 0% to the switch driving circuit when (e.g., in response to) receiving a collision information signal generated by a collision sensor.

The battery controller may be configured to output a PWM signal having a duty ratio monotonically decreasing according to the acceleration magnitude and in a duty ratio range between a minimum duty ratio for maintaining the switch in a closed state and 100% duty ratio when the acceleration magnitude is less than a first threshold value.

The acceleration signal may include a longitudinal acceleration signal and a lateral acceleration signal. The battery controller may be configured to output a PWM signal having the first duty ratio to the switch driving circuit when at least one selected from a longitudinal acceleration magnitude of the longitudinal acceleration signal and a lateral acceleration magnitude of the lateral acceleration signal is greater than or equal to the first threshold value and less than the second threshold value.

Example embodiments will be described in more detail with reference to the accompanying drawings, so that features will be apparent to those of ordinary skill in the art.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of" and "at least one selected from," when preceding a list of elements, modify the entire list of elements and do not modify the individual elements of the list. As used herein, the use of the term "may," when describing embodiments of the present disclosure, refers to "one or more embodiments of the present disclosure." As used herein, the term "substantially," "about," "approximately," and similar terms are used as terms of approximation and not as terms of degree, and are intended to account for the inherent deviations in measured or calculated values that would be recognized by those of ordinary skill in the art. Also, as used herein, the terms "to close" and "to open" a switch refer to a case in which the switch is changed from open to close, and from close to open, respectively or a case in which the switch is maintained to be closed and maintained to be opened, respectively.

Now, example embodiments will be described in more detail with reference to the accompanying drawings. However, the example embodiments can be embodied in many suitable forms and should not be considered as being limited to the embodiments described herein. Rather, these embodiments are provided to make the disclosure of the present disclosure complete, and to fully inform the scope of the present disclosure to those of ordinary skill in the art to which the present disclosure pertains.

The terms used in this application are only used to describe specific embodiments, and are not intended to limit the present disclosure. As used herein, the singular forms "a," "an," and the "the" are intended to include the plural forms as well, unless the context clearly indicates otherwise. It will be further understood that the terms "comprises" and "comprising" used herein specify the presence of stated features and/or components, but do not preclude the presence or addition of one or more other features and/or components. It will be understood that although the terms "first," "second," etc. may be used herein to describe various components, these components should not be limited by these terms. These terms are used only to distinguish one component from other components.

Hereinafter, the embodiments will be described more completely with reference to the accompanying drawings in which example embodiments are shown. The same reference numerals throughout the specification represent the same components. Those components that are the same or are in correspondence are rendered the same reference numeral regardless of the drawing number, and a redundant description thereof may not be provided.

Figure 1:
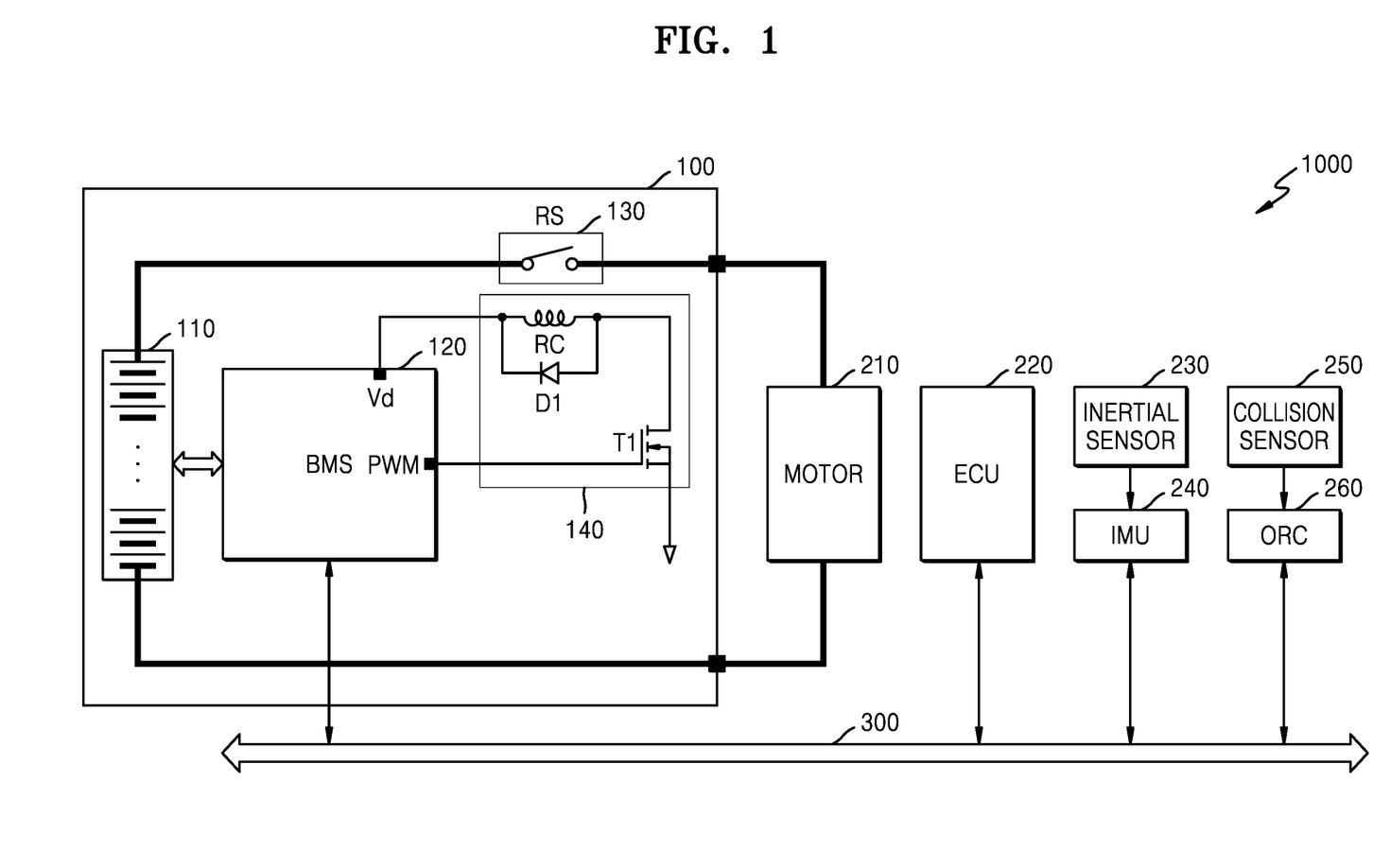
FIG. 1 schematically illustrates some configurations of a vehicle including a battery pack according to an embodiment.

FIG. 1 schematically illustrates some configurations of a vehicle including a battery pack according to an embodiment.

Referring to FIG. 1, a vehicle 1000 includes a battery 110, an electric motor 210 driven by electric energy stored in the battery 110, a switch 130 coupled (e.g., connected) between the battery 110 and the electric motor 210, an inertial sensor 230 that outputs an acceleration signal, a battery controller 120 that outputs a pulse width modulation (PWM) signal having a duty ratio adjusted according to an acceleration magnitude corresponding to the acceleration signal, and a switch driving circuit 140 that generates a control current for controlling the switch 130 based on the PWM signal.

In some embodiments, a battery pack 100 may be mounted on the vehicle 1000 and may include a battery 110, a switch 130, a switch driving circuit 140, and a battery controller 120.

The battery 110 may include at least one battery cell, and the battery cell may be a rechargeable secondary battery. For example, the battery cell may include (e.g., be) at least one selected from the group consisting of a nickel-cadmium battery, a lead acid battery, a nickel metal hydride battery, a lithium ion battery, a lithium polymer battery, and the like.

The number of battery cells included in the battery 110 and a coupling method (e.g., connection method) may be determined based on an amount of power required by electric loads of the vehicle 1000, an operating voltage of the electric motor 210, and/or the like.

FIG. 1, for conceptual purposes only, illustrates the battery 110 in which battery cells are coupled (e.g., connected) in series, but the battery 110 may include a plurality of battery modules, each including a plurality of battery cells. The battery pack 100 may include a pair of power terminals to which an electric load such as the electric motor 210 may be coupled (e.g., connected).

The switch 130 may be coupled (e.g., connected) between the battery 110 and the electric motor 210 and may control a current that flows from the battery 110 to the electric motor 210. The switch 130 may be controlled by the switch driving circuit 140. The switch driving circuit 140 may generate a control current for controlling the switch 130, and the switch 130 may be opened or closed according to the control current.

For example, when the magnitude of the control current is greater than or equal to the magnitude of an operating current of the switch 130, the switch 130 may be closed, and when the magnitude of the control current is less than the magnitude of the operating current of the switch 130, the switch 130 may be opened. Here, the magnitude of the operating current may be determined by the specifications of the switch 130 and may refer to a current that determines whether to open or close the switch 130. For example, the operating current may refer to the minimum control current required to cause the switch 130 to be closed.

The switch 130 may be a relay switch RS, as shown in FIG. 1. The switch driving circuit 140 may include a relay coil RC for controlling the relay switch RS. When current that is greater than or equal to the magnitude of the operating current flows through the relay coil RC, the relay coil RC may generate a magnetic force proportional to the magnitude of the current (e.g., the current flowing through the relay coil RC), and the relay switch RS may be closed while being coupled (e.g., connected) to a contact point by the (e.g., due to the) magnetic force. When current that is less than the magnitude of the operating current flows through the relay coil RC, the relay coil RC may not generate a magnetic force having a sufficient magnitude (e.g., a sufficient magnitude to close the relay switch RS), and the relay switch RS may be opened while being separated from the contact point by a spring that acts in an opposite direction (e.g., a direction opposite to the direction of the magnetic force on the relay switch RS). The relay switch RS and the relay coil RC may constitute a relay element.

The switch driving circuit 140 may further include a control switch T1 coupled (e.g., connected) to the relay coil RC in series. The control switch T1 may receive a PWM signal from the battery controller 120. The PWM signal may have a duty ratio set by the battery controller 120. For example, when the PWM signal has a duty ratio of 80%, the PWM signal that is a square or rectangular wave signal (having a set or preset period) may be a signal in which a high level section is 80% of the entire section.

When the duty ratio of the PWM signal increases, the magnitude of an average current flowing through the relay coil RC increases, and when the duty ratio of the PWM signal decreases, the magnitude of the average current flowing through the relay coil RC decreases. Thus, opening and closing of the switch 130 may be controlled by the duty ratio of the PWM signal. In the present specification, when the PWM signal having a duty ratio greater than or equal to a threshold duty ratio is applied to the control switch T1 of the switch driving circuit 140, the switch 130 may be closed, and when the PWM signal having a duty ratio less than the threshold duty ratio is applied to the control switch T1, the switch 130 may be opened. For example, the threshold duty ratio may be a minimum duty ratio that causes the PWM signal to generate a current in the relay coil RC that closes the switch 130. For example, the threshold duty ratio may cause the PWM signal to generate the operating current in the relay coil RC. In the present specification, a duty ratio that is a reference for determining opening and closing of the switch 130 is referred to as a threshold duty ratio.

A driving voltage Vd of the switch driving circuit 140 may be supplied by the battery controller 120. However, this is an example. For example, in some embodiments, an output voltage of the battery 110 may be a driving voltage of the switch driving circuit 140.

The switch driving circuit 140 may further include a diode D1 coupled (e.g., connected) to the relay coil RC in parallel, and the diode D1 may function as a freewheeling diode. In some embodiments the diode D1 may be a flyback diode. The diode D1 may be coupled (e.g., connected) to both ends of the relay coil RC to form a closed circuit for releasing energy accumulated in the relay coil RC, may secure linearity of a current flowing through the relay coil RC, and may perform a function of suppressing excessive voltage rise that may occur when the control switch T1 is switched by the PWM signal. The diode D1 may have (e.g., may be selected as a diode having) fast response characteristics.

The control switch T1 may be a switching element that receives the PWM signal from the battery controller 120 and applies current to the relay coil RC in response to the PWM signal. The control switch T1 may be a switching element capable of high-speed switching such as a field effect transistor (FET) that may be turned on and off accurately in response to the PWM signal.

In another example, the switch 130 may be a power semiconductor switch, and the switch driving circuit 140 may be a control circuit that may control opening and closing of the power semiconductor switch, and the control circuit may receive the PWM signal from the battery controller 120.

In some embodiments, the battery controller 120 may manage the battery 110. The battery controller 120 may manage a charging state of the battery 110 and a charging/discharging current. For example, the battery controller 120 may measure a cell voltage of each of battery cells of the battery 110, may measure the temperature of the battery 110, and/or may equalize the cell voltages of the battery cells. When the battery 110 is overcharged, overdischarged and/or in a high temperature state, the battery controller 120 may detect it and open the switch 130.

In some embodiments, the battery pack 100 may further include a battery protection circuit, a fuse, a current sensor, and/or the like.

The electric motor 210 may be driven by electric energy stored in the battery 110 to move or operate the vehicle 1000. Although only the electric motor 210 is shown in FIG. 1, a general electric load of the vehicle 1000 such as a generator, a heater, or an air conditioner, may be coupled (e.g., connected) to the electric motor 210 in series. Also, although the electric motor 210 is shown to be directly coupled (e.g., connected) to a power terminal of the battery pack 100, this is only conceptual, and the present disclosure is not limited thereto. For example, in some embodiments, an inverter circuit or a DC-DC converter circuit may be arranged between the battery pack 100 and the electric motor 210.

The vehicle 1000 may include an electronic control unit 220. The electronic control unit 220 may control the entire operation of the vehicle 1000. For example, the electronic control unit 220 may control an engine, an automatic transmission, and/or the like of a vehicle.

The vehicle 1000 may include an inertial sensor 230. The inertial sensor 230 may include a yaw rate sensor and/or an angular acceleration sensor. The inertial sensor 230 may detect acceleration of the vehicle 1000 to output an acceleration signal. The acceleration signal may include a longitudinal acceleration signal and/or a lateral acceleration signal.

The vehicle 1000 may include an inertial measurement unit 240. The inertial measurement unit 240 may receive the acceleration signal from the inertial sensor 230 and may generate acceleration information of the vehicle 1000 based on the acceleration signal and may output it. The acceleration information may include longitudinal acceleration information and/or lateral acceleration information.

The inertial measurement unit 240 may calculate a horizontal acceleration magnitude utilizing (e.g., using) the longitudinal acceleration information and the lateral acceleration information. For example, the horizontal acceleration magnitude may be calculated by calculating a square root after adding the square of the longitudinal acceleration magnitude to the square of the lateral acceleration magnitude. For example, the horizontal acceleration magnitude may be the square root of the sum of the square of the longitudinal acceleration magnitude and the square of the lateral acceleration magnitude.

The vehicle 1000 may include a collision sensor 250. When the collision sensor 250 detects collision of the vehicle 1000 and collision is detected, the collision sensor 250 may output a collision signal. For example, the collision sensor 250 may be configured to detect a collision of the vehicle 1000, and when the collision sensor 250 may be configured to output a collision signal upon detecting a collision of the vehicle 1000.

The vehicle 1000 may include an occupant protection controller 260. The occupant protection controller 260 may perform an operation such as unfolding an airbag when receiving the collision signal from the collision sensor 250.

The battery controller 120, the electronic control unit 220, the inertial measurement unit 240, and the occupant protection controller 260 may communicate with one another via a communication bus 300. The communication bus 300 may be a controller area network (CAN) communication bus.

The acceleration information generated based on the acceleration signal output by the inertial sensor 230 and the collision information generated based on the output signal output by the collision sensor 250 may be received by the battery controller 120 via the communication bus 300. In another example, the inertial sensor 230 may transmit the acceleration signal to the battery controller 120 via the communication bus 300, and the collision sensor 250 may transmit the collision signal to the battery controller 120 via the communication bus 300. In another example, the inertial sensor 230 may transmit the acceleration signal directly to the battery controller 120, and the collision sensor 250 may transmit the collision signal directly to the battery controller 120.

Figure 2:
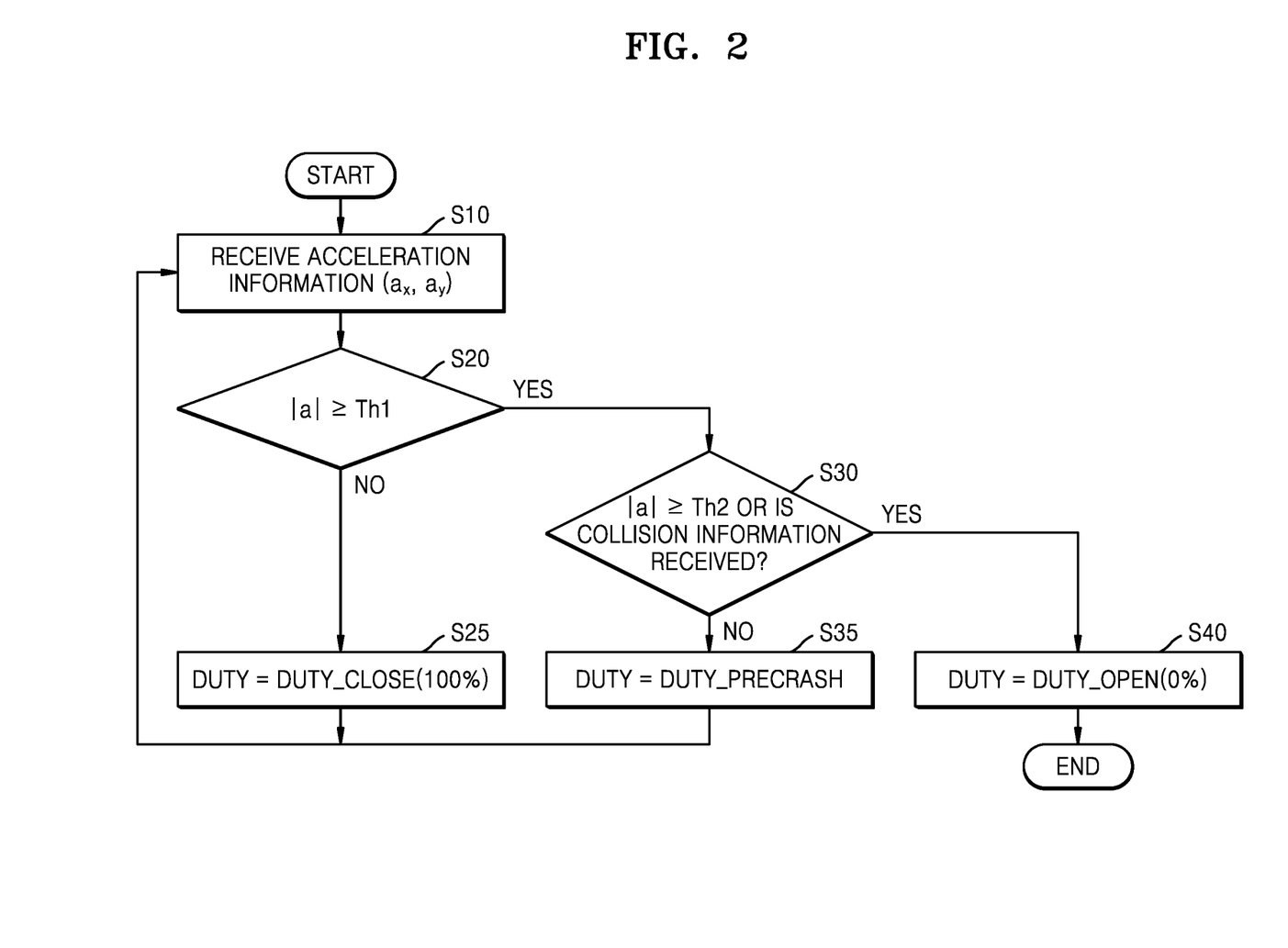
FIG. 2 illustrates an operation flow of a battery controller according to an embodiment.

FIG. 2 illustrates an operation flow of a battery controller according to an embodiment.

Referring to FIG. 2 together with FIG. 1, the battery controller 120 may receive acceleration information generated based on an acceleration signal output by the inertial sensor 230 (S10). The battery controller 120 may receive the acceleration information via the communication bus 300, and the acceleration information may be transmitted from, for example, the inertial measurement unit 240 and/or the electronic control unit 220, which may receive the acceleration signal (e.g., from the inertial measurement unit 240).

The acceleration information may include lateral acceleration information corresponding to lateral acceleration $a_x$ and longitudinal acceleration information corresponding to longitudinal acceleration $a_y$. In an example, the battery controller 120 may calculate a horizontal acceleration magnitude based on the lateral acceleration information and the longitudinal acceleration information. For example, a horizontal acceleration magnitude |a| may be calculated as $(a_x^2+a_y^2)^{1/2}$. The horizontal acceleration magnitude |a| is briefly referred to below as acceleration magnitude |a|.

The battery controller 120 may compare the acceleration magnitude |a| with a first threshold value Th1 and a second threshold value Th2 (S20 and S30). The second threshold value Th2 may be an acceleration value that is large enough to be regarded as a serious vehicle accident. For example, the second threshold value Th2 may be (e.g., may be selected or set) between 15 g and 30 g. Here, g is gravity acceleration (e.g., approximately or about 9.8 m/s$^2$).

The first threshold value Th1 may be an acceleration value before the occurrence of a relatively minor accident or a serious accident of the vehicle. The first threshold value Th1 may be less than the second threshold value Th2 and may be (e.g., may be selected or set), for example, between 5 g and 15 g and may be, for example, 10 g.

The first threshold value Th1 may be set so that, when a vehicle operates normally, the acceleration magnitude |a| does not reach the first threshold value Th1. It is known that it is difficult for a vehicle, which accelerates and decelerates, to exceed 1.5 g of acceleration (e.g., to exceed in acceleration magnitude 1.5 g) in a normal environment. The first threshold value Th1 may be set to be greater than 1.5 g.

The first threshold value Th1 and the second threshold value Th2 may vary according to the performance, type (e.g., kind) and frame structure of the vehicle. The first threshold value Th1 and the second threshold value Th2 do not limit the present disclosure. Below, for illustrative purposes only, it is assumed that the first threshold value Th1 is 10 g and the second threshold value is 20 g.

The battery controller 120 may compare the acceleration magnitude |a| with the first threshold value Th1 (S20).

When the acceleration magnitude |a| is less than the first threshold value Th1, the battery controller 120 may output a PWM signal having a duty value (duty ratio) of a first setting value DUTY_CLOSE for completely closing the switch 130 to the switching driving circuit 140 (S25). The first setting value DUTY_CLOSE may be, for example, 100%. For example, the battery controller 120 may output the PWM signal having a duty value (duty ratio) of 100%, e.g., a control signal at a high level to the control switch T1. The control switch T1 may be turned on by the PWM signal having a duty value (duty ratio) of 100%, and current that is greater than or equal to an operating current may flow through the relay coil RC so that the switch 130 may be closed.

After Operation S25 is performed, the battery controller 120 may proceed to Operation S10 and may receive the acceleration information.

When the acceleration magnitude |a| is greater than or equal to the first threshold value Th1, the battery controller 120 may compare the acceleration magnitude |a| with the second threshold value Th2 (S30). The battery controller 120 may determine whether to receive collision information generated based on the collision signal output by the collision sensor 250 (S30). In some embodiments, the battery controller 120 may determine whether it has received collision information generated based on the collision signal output by the collision sensor 250 (S30).

When the acceleration magnitude |a| is greater than or equal to the first threshold value Th1 and is less than the second threshold value Th2, and the battery controller 120 does not receive collision information, the battery controller 120 may output the PWM signal having a duty ratio of a second setting value DUTY_PRECRASH for not opening the switch 130 to the switch driving circuit 140 (S35). The second setting value DUTY_PRECRASH may be set greater than a value of a threshold duty ratio. The second setting value DUTY_PRECRASH may be, for example, 60%. For example, the battery controller 120 may output a PWM signal having a duty value (duty ratio) of 60% to the control switch T1. The control switch T1 may be repeatedly turned on or off by the PWM signal having the duty value (duty ratio) of 60%, the magnitude of current flowing through the relay coil RC may decrease, and the switch 130 may be still maintained in a closed state.

After Operation S35 is performed, the battery controller 120 may proceed to Operation S10 and may receive acceleration information.

When the acceleration magnitude |a| is greater than or equal to the second threshold value Th2 and/or the battery controller 120 receives the collision information, the battery controller 120 may output a PWM signal having a duty value (duty ratio) of a third setting value DUTY_OPEN for opening (e.g., completely opening) the switch 130 to the switch driving circuit 140 (S40). The third setting value DUTY_OPEN may be, for example, 0%. For example, the battery controller 120 may output a PWM signal having a duty value (duty ratio) of 0%, e.g., a control signal at a low level to the control switch T1. The control switch T1 may be turned off by the PWM signal having a duty value (duty ratio) of 0%, no current may flow through the relay coil RC, and the switch 130 may be opened.

After Operation S40 is performed, the battery controller 120 may be terminated (e.g., operation of the battery controller 120 may be terminated). In some embodiments, even when the acceleration information is changed, the battery controller 120 does not adjust the duty ratio by reflecting this. For example, after Operation S40 is performed, the switch 130 may not be closed again without separate manual control.

According to another embodiment, the battery controller 120 may compare the lateral acceleration magnitude |ax| and the longitudinal acceleration magnitude |ay| with the first threshold value Th1 and the second threshold value Th2, respectively (S20 and S30).

For example, in Operation S20, the battery controller 120 may compare each of the lateral acceleration magnitude |ax| and the longitudinal acceleration magnitude |ay| with the first threshold value Th1 (S20). The battery controller 120 may perform Operation S25 when both the lateral acceleration magnitude |ax| and the longitudinal acceleration magnitude |ay| are less than the first threshold value Th1. The battery controller 120 may perform Operation S30 when at least one selected from the lateral acceleration magnitude |ax| and the longitudinal acceleration magnitude |ay| is greater than or equal to the first threshold value Th1.

In Operation S30, the battery controller 120 may compare each of the lateral acceleration magnitude |ax| and the longitudinal acceleration magnitude |ay| with the second threshold value Th2 and may determine whether to receive collision information (S30). In some embodiments, in operation S30, the battery controller 120 may compare each of the lateral acceleration magnitude |ax| and the longitudinal acceleration magnitude |ay| with the second threshold value Th2 and may determine whether collision information has been received. The battery controller 120 may perform Operation S35 when both the lateral acceleration magnitude |ax| and the longitudinal acceleration magnitude |ay| are less than the second threshold value Th2 and the battery controller 120 does not receive collision information. When at least one selected from the lateral acceleration magnitude |ax| and the longitudinal acceleration magnitude |ay| is greater than or equal to the second threshold value Th2 or the battery controller 120 receives the collision information, the battery controller 120 may perform Operation S40.

The present disclosure is not limited to the above-described embodiments. For example, in some embodiments, the battery controller 120 may compare the horizontal acceleration magnitude |a|, the lateral acceleration magnitude |ax|, and/or the longitudinal acceleration magnitude |ay| to respective first threshold values in operation S20 and to respective second threshold values in operation S30. For example, a first threshold value that the horizontal acceleration magnitude |a| is to be compared to, a first threshold value that the lateral acceleration magnitude |ax| is to be compared to, and a first threshold value that the longitudinal acceleration magnitude |ay| is to be compared to may each be the same value or may be different values. Similarly, in some embodiments, a second threshold value that the horizontal acceleration magnitude |a| is to be compared to, a second threshold value that the lateral acceleration magnitude |ax| is to be compared to, and a second threshold value that the longitudinal acceleration magnitude |ay| is to be compared to may each be the same value or may be different values.

Figure 3:
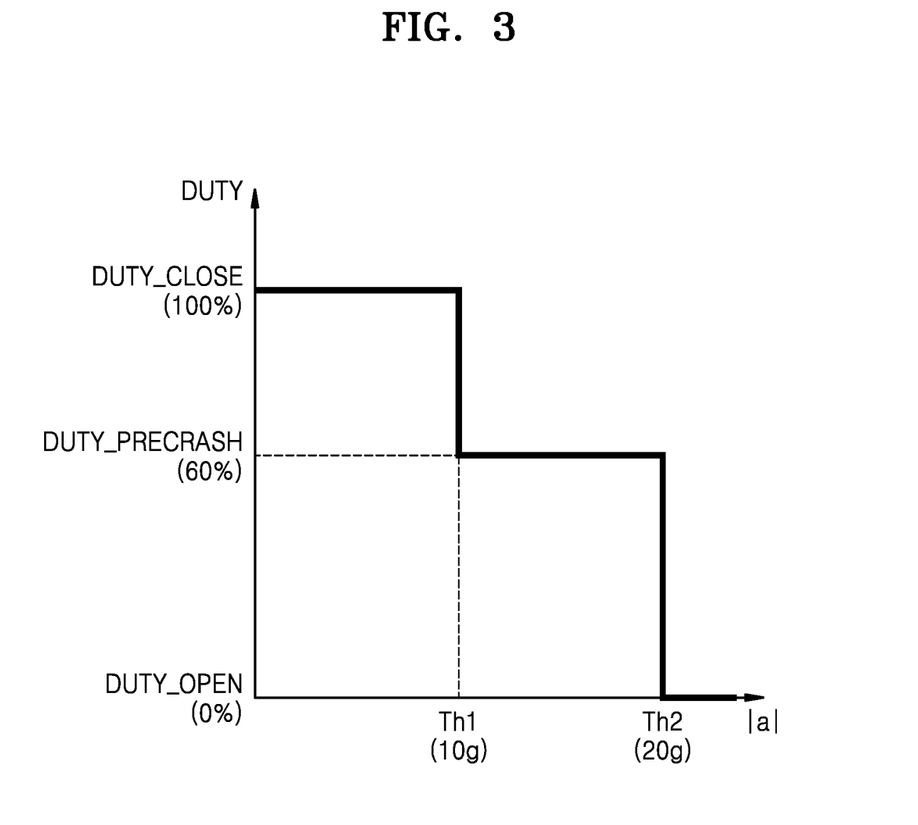
FIG. 3 is a graph showing a setting value of a duty ratio according to a magnitude of acceleration (acceleration magnitude) according to an embodiment.

FIG. 3 is a graph showing a setting value of a duty ratio according to an acceleration magnitude according to an embodiment.

The battery controller 120 may determine a duty ratio of a PWM signal to be output to the control switch T1 according to the acceleration magnitude |a|, as shown in FIG. 3.

When the acceleration magnitude |a| is greater than or equal to 0 and less than a first threshold value Th1 (the first threshold value Th1 being, for example, 10 g), the battery controller 120 may output a PWM signal having a duty ratio of a first setting value DUTY_CLOSE (for example, 100%) to the control switch T1. The switch 130 may be closed by the switch driving circuit 140.

When the acceleration magnitude |a| is greater than or equal to a first threshold value Th1 (the first threshold value Th1 being, for example, 10 g) and less than a second threshold value Th2 (the second threshold value Th2 being, for example, 20 g), the battery controller 120 may output a PWM signal having a duty ratio of a second setting value DUTY_PRECRASH (for example, 60%) to the control switch T1. The switch 130 may be maintained in a closed state by the switch driving circuit 140, however, the magnitude of current flowing through the relay coil RC decreases.

When the acceleration magnitude |a| is greater than or equal to a second threshold value Th2 (the second threshold value Th2 being, for example, 20 g) the battery controller 120 may output a PWM signal having a duty ratio of a third setting value DUTY_OPEN (for example, 0%) to the control switch T1. Accordingly, the switch 130 may be opened by the switch driving circuit 140.

Figure 4:
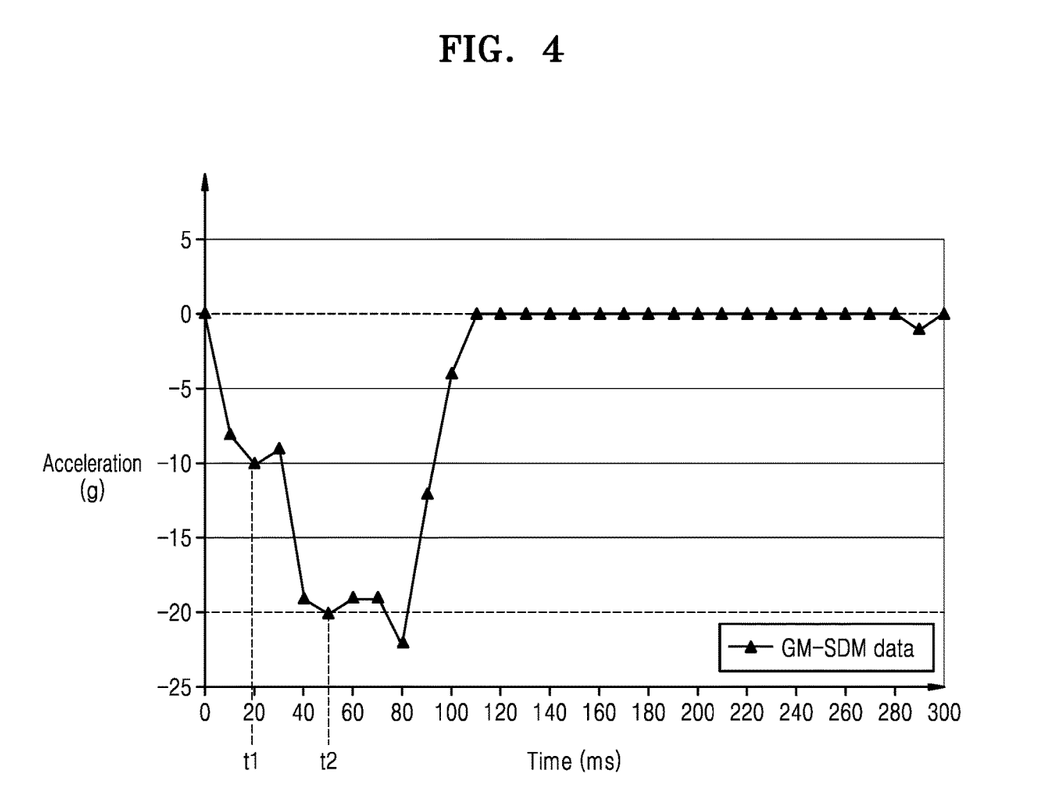
FIG. 4 is a graph showing a change of acceleration during a vehicle collision.

FIG. 4 is a graph showing a change of acceleration during a vehicle collision.

A vehicle accident occurred at time 0 s. After about 20 ms, it has a deceleration of −10 g, after about 50 ms, it has a deceleration of −20 g, and after 80 ms, it has the largest deceleration. Thereafter, a deceleration magnitude decreases, and an acceleration motion of the vehicle disappears after 110 ms. The term "deceleration" may refer to an acceleration in a direction opposite (e.g., substantially opposite) to a vehicle's direction of horizontal motion relative to the ground. The magnitude of the deceleration may correspond to (e.g., be) the magnitude of the horizontal acceleration |a|.

A first time t1 is a time when the deceleration magnitude reaches a first threshold value Th1 of 10 g, and a second time t2 is a time when the deceleration magnitude reaches a second threshold value Th2 of 20 g.

Figure 5A:
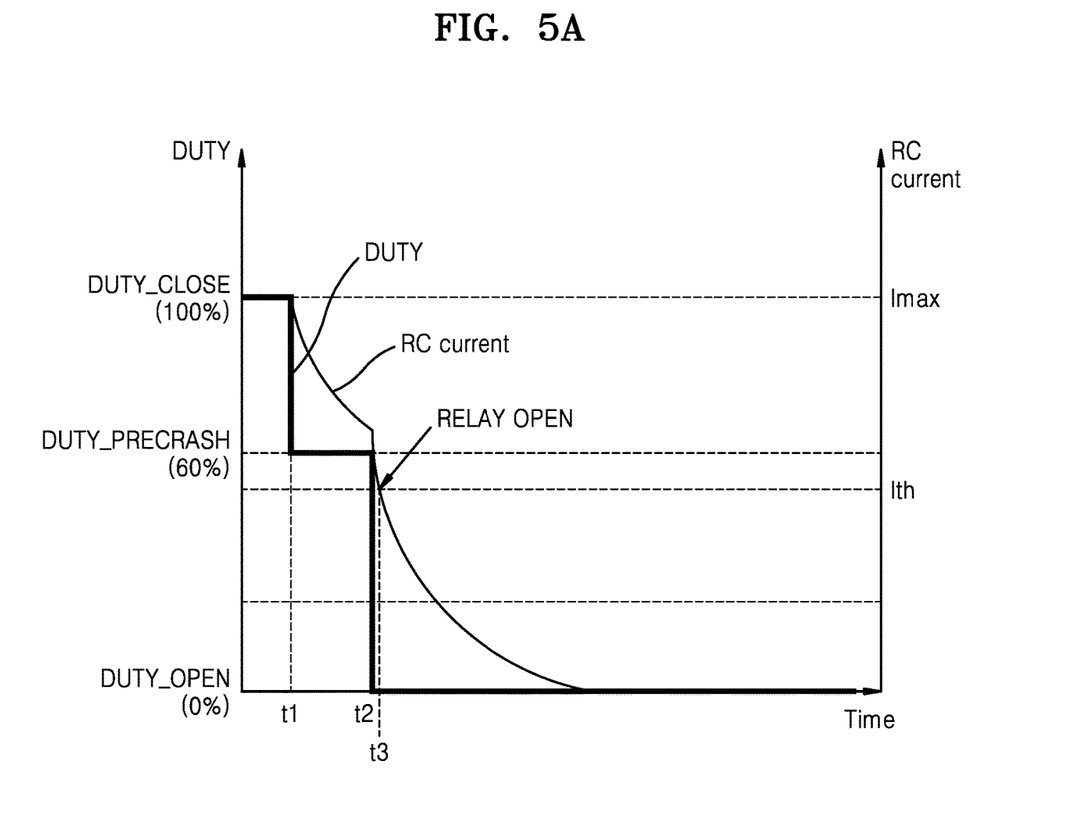
FIG. 5A shows a duty ratio of a pulse width modulation (PWM) signal and a coil current in an operation of a battery controller according to an embodiment of the present disclosure.
Figure 5B:
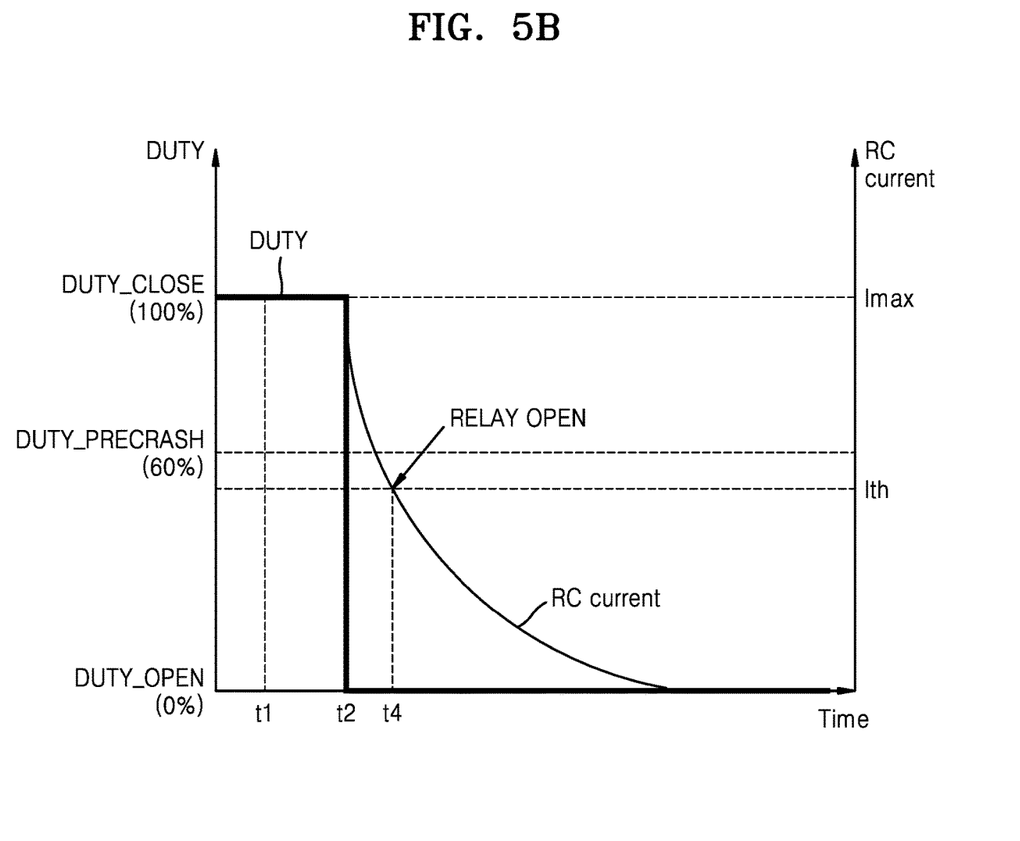
FIG. 5B shows a duty ratio of a PWM signal and a coil current in an operation of a battery controller according to the related art.

FIG. 5A shows a duty ratio of a PWM signal and a coil current when operated by a battery controller according to the present disclosure, and FIG. 5B shows a duty ratio of a PWM signal and a coil current when operated by a battery controller according to the related art.

Referring to FIG. 5A, according to the present disclosure, at the first time t1, a duty ratio of a PWM signal may decrease to a second setting value DUTY_PRECRASH (for example, 60%), and the current of the relay coil RC may decrease.

At the second time t2, a duty ratio of a PWM signal may decrease to a third setting value DUTY_OPEN (for example, 0%), and the current of the relay coil RC may decrease. At a third time t3 when the current of the relay coil RC decreases compared to an operating current Ith (e.g., decreases below the operating current Ith), the switch 130 may be opened. The second time t2 and the third time t3 may be less than or equal to 5 ms. In some embodiments, the difference between the third time t3 and the second time t2 may be less than or equal to 5 ms.

However, in the related art, as shown in FIG. 5B, at the second time t2, a duty ratio of a PWM signal may decrease to a third setting value DUTY_OPEN (for example, 0%), and the current of the relay coil RC may decrease. At a fourth time t4 when the current of the relay coil RC decreases compared to the operating current Ith (e.g., decreases below the operating current Ith), the switch 130 may be opened. The second time t2 and the fourth time t4 may be about 20 ms. The difference between the fourth time t4 and the second time t2 may be about 20 ms.

As described above, because, in the related art, even if an accident occurs in a vehicle and deceleration of the vehicle has a large value, the current of the relay coil RC driving the switch 130 does not decrease rapidly, and it takes about 20 to 30 ms to actually open the switch 130. During this time, an electric current flows through the damaged body or wiring of the vehicle, which may cause a major accident such as a fire.

According to the present disclosure, the occurrence of an accident may be detected in advance through (e.g., at) the first threshold value Th1, and the current of the relay coil RC may be decreased (e.g., may begin decreasing) in advance. Thus, when the deceleration of the vehicle is greater than or equal to the second threshold value Th2, the switch 130 may be opened within a very short time so that the possibility of occurrence of additional damage may be significantly reduced.

Figure 6:
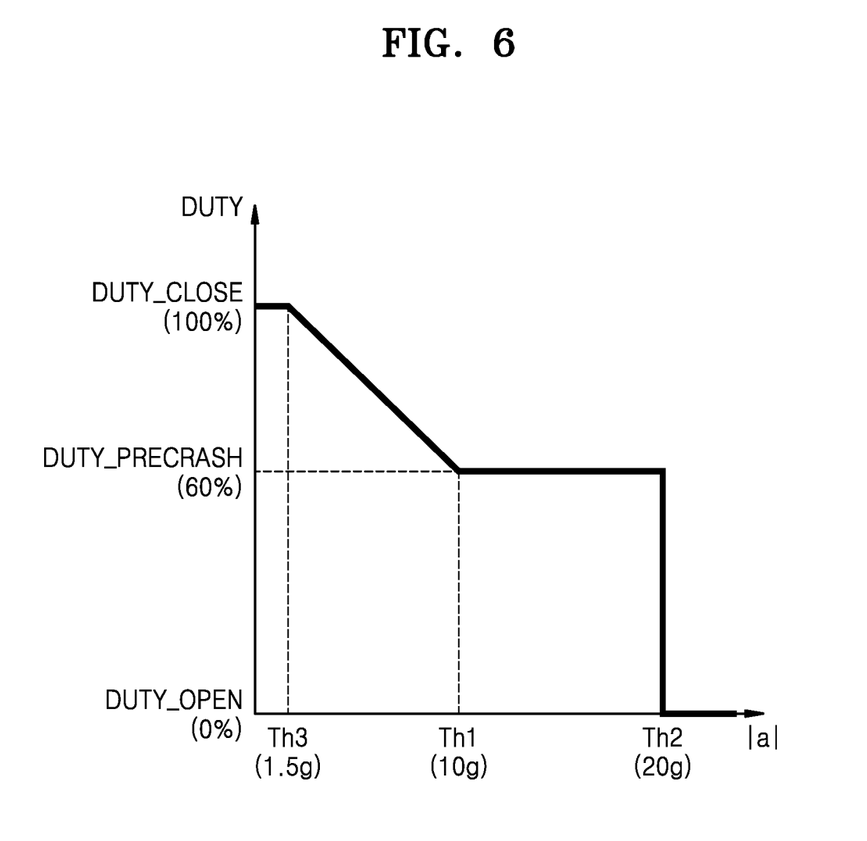
FIG. 6 is a graph showing a setting value of a duty ratio according to a magnitude of acceleration (acceleration magnitude) according to another embodiment.

FIG. 6 is a graph showing a setting value of a duty ratio according to an acceleration magnitude according to another embodiment.

According to another embodiment, the battery controller 120 may determine a duty ratio of a PWM signal to be output to the control switch T1 according to the acceleration magnitude |a|, as shown in FIG. 6.

When the acceleration magnitude |a| is less than the first threshold value Th1 (the first threshold value Th1 being, for example, 10 g), the battery controller 120 may be configured to output a PWM signal having a duty ratio monotonically decreasing according to the acceleration magnitude |a| in a duty ratio range between a minimum duty ratio (e.g., a threshold duty ratio) for maintaining the switch 130 in a closed state and 100% duty ratio, to the switch driving circuit 140.

For example, when the acceleration magnitude |a| is greater than or equal to 0 and less than a third threshold value Th3 (the third threshold value Th3 being, for example, 1.5 g), the battery controller 120 may output a PWM signal having a duty ratio of a first setting value DUTY_CLOSE (for example, 100%) to the control switch T1. Accordingly, the switch 130 may be closed by the switch driving circuit 140.

When the acceleration magnitude |a| is greater than or equal to the third threshold value Th3 (the third threshold value Th3 being, for example, 1.5 g) and less than the first threshold value Th1 (the first threshold value Th1 being, for example, 10 g), the battery controller 120 may output a PWM signal having a duty ratio monotonically decreasing according to the acceleration magnitude |a| (e.g., linearly decreasing as the acceleration magnitude |a| increases), as shown in FIG. 6, to the control switch T1. For example, the battery controller 120 may output a PWM signal having a duty ratio inversely proportional to the acceleration magnitude |a|. The switch 130 may be closed by the switch driving circuit 140.

In FIG. 6, the duty ratio is shown to decrease in a linear function according to the acceleration magnitude |a|, but this is only an example, and may decrease non-linearly or stepwise.

When the acceleration magnitude |a| is greater than or equal to the first threshold value Th1 (the first threshold value Th1 being, for example, 10 g) and less than the second threshold value Th2 (the second threshold value Th2 being, for example, 20 g), the battery controller 120 may output a PWM signal having a duty ratio of a second setting value DUTY_PRECRASH (for example, 60%) to the control switch T1. The switch 130 may be maintained in a closed state by the switch driving circuit 140, and the magnitude of current flowing through the relay coil RC may decrease.

When the acceleration magnitude |a| is greater than or equal to the second threshold value Th2 (the second threshold value Th2 being, for example, 20 g), the battery controller 120 may output a PWM signal having a duty ratio of a third setting value DUTY_OPEN (for example, 0%) to the control switch T1. The switch 130 may be opened by the switch driving circuit 140.

In a vehicle and a battery pack having the same according to the present disclosure, a duty ratio of a pulse width modulation signal may be reduced in advance before collision (e.g., may be reduced before detection of a collision) based on dynamic information of the vehicle so that a relay driving current may be rapidly reduced (e.g., may begin reducing before detection of the collision). Thus, the time required for a relay to actually open may be reduced, and the possibility of occurrence of additional damage due to vehicle collision may be reduced, and additional damage may also be reduced.

Various embodiments of the present disclosure described herein do not limit the scope of the present disclosure in any way. For the sake of brevity, electronics, control systems, software development and other functional aspects of the systems (and components of the individual operating components of the systems) may not be described in more detail. Furthermore, the connection lines, or connectors shown in the various drawings presented herein are intended to represent example functional relationships and/or physical or logical couplings (e.g., connections) between the various elements, but the present disclosure is not limited thereto. It should be noted that many alternative or additional suitable functional relationships, physical couplings (e.g., connections) or logical connections may be present in a practical device according to embodiments included in the present disclosure. Moreover, no item or component is essential to the practice of the present disclosure unless the element is specifically described as "essential" or "critical".

In the specification of embodiments (for example, the claims), the use of the terms "a," "an," and "the" and similar terms in the context of describing the present disclosure (for example, in the context of the following claims) are to be construed to cover both the singular and the plural. Furthermore, recitation of ranges of values herein are merely intended to serve as a shorthand method of referring individually to each separate value and to each separate subrange falling within the range, unless otherwise indicated herein, and each separate value and each separate subrange is incorporated into the specification as if it were individually recited herein. Finally, the steps or tasks of all methods described herein can be performed in any suitable order unless otherwise indicated herein or otherwise clearly contradicted by context. The present disclosure is not necessarily limited according to the described order of the steps or tasks. The use of any and all examples, or example language (e.g., "such as") provided herein, is intended merely to better illuminate the present disclosure and does not pose a limitation on the scope of the present disclosure unless otherwise provided or claimed. Numerous suitable modifications and adaptations will be readily apparent to those of ordinary skill in the art without departing from the spirit and scope of the present disclosure.

It should be understood that embodiments described herein should be considered in a descriptive sense only and not for purposes of limitation. Descriptions of features and/or aspects within each embodiment should typically be considered as available for other similar features and/or aspects in other embodiments. While one or more embodiments have been described with reference to the drawings, it will be understood by those of ordinary skill in the art that various suitable changes in form and details may be made therein without departing from the spirit and scope of the disclosure as defined by the following claims and equivalents thereof.

What is claimed is:

1. A vehicle comprising:
   a battery;
   an electric motor to be actuated by electric energy stored in the battery;
   a switch coupled between the battery and the electric motor;
   an inertial sensor configured to output an acceleration signal;
   a controller configured to output a pulse width modulation (PWM) signal having a duty ratio according to an acceleration magnitude of the acceleration signal; and
   a switch driving circuit configured to generate a control current for controlling the switch based on the PWM signal, wherein
      the controller is configured to output a PWM signal having a duty ratio monotonically decreasing according to the acceleration magnitude and in a duty ratio range between a minimum duty ratio for maintaining the switch in a closed state and 100% duty ratio when the acceleration magnitude is less than a first threshold value.

2. The vehicle of claim 1, wherein, the controller is configured to output a PWM signal having a set first duty ratio to the switch driving circuit when the acceleration magnitude is greater than or equal to a second threshold value and less than a third threshold value that is greater than the second threshold value, and the first duty ratio is greater than the minimum duty ratio for maintaining the switch in a closed state and is less than 100% duty ratio.

3. The vehicle of claim 2, wherein the controller is configured to output a PWM signal having a duty ratio of 100% to the switch driving circuit to close the switch when the acceleration magnitude is less than the second threshold value, and the controller is configured to output a PWM signal having a duty ratio of 0% to the switch driving circuit to open the switch when the acceleration magnitude is greater than or equal to the third threshold value.

4. The vehicle of claim 2, further comprising a collision sensor configured to output a collision signal when a collision is detected, wherein the controller is configured to output a PWM signal having a duty ratio of 0% to the switch driving circuit in response to receiving the collision signal.

5. The vehicle of claim 2, wherein the acceleration signal comprises a longitudinal acceleration signal and a lateral acceleration signal, and the controller is configured to output a PWM signal having the first duty ratio to the switch driving circuit when at least one selected from a longitudinal acceleration magnitude of the longitudinal acceleration signal and a lateral acceleration magnitude of the lateral acceleration signal is greater than or equal to the second threshold value and less than the third threshold value.

6. A battery pack for a vehicle, the battery pack comprising:
   a battery;
   a switch coupled between the battery and an external terminal;
   a battery controller configured to receive an acceleration signal from the vehicle and to output a pulse width modulation (PWM) signal having a duty ratio according to an acceleration magnitude; and
   a switch driving circuit configured to generate a control current for controlling the switch based on the PWM signal, wherein
      the battery controller is configured to output a PWM signal having a duty ratio monotonically decreasing according to the acceleration magnitude and in a duty ratio range between a minimum duty ratio for maintaining the switch in a closed state and 100% duty ratio when the acceleration magnitude is less than a first threshold value.

7. The battery pack of claim 6, wherein, the battery controller is configured to output a PWM signal having a set first duty ratio to the switch driving circuit when the acceleration magnitude is greater than or equal to a second threshold value and is less than a third threshold value that is greater than the second threshold value, and the first duty ratio is greater than the minimum duty ratio for maintaining the switch in a closed state and is less than 100% duty ratio.

8. The battery pack of claim 7, wherein the battery controller is configured to output a PWM signal having a duty ratio of 100% to the switch driving circuit to close the switch when the acceleration magnitude is less than the second threshold value, and the battery controller is configured to output a PWM signal having a duty ratio of 0% to the switch driving circuit to open the switch when the acceleration magnitude is greater than or equal to the third threshold value.

9. The battery pack of claim 7, wherein the battery controller is configured to output a PWM signal having a duty ratio of 0% to the switch driving circuit in response to receiving a collision information signal generated by a collision sensor.

10. The battery pack of claim 7, wherein the acceleration signal comprises a longitudinal acceleration signal and a lateral acceleration signal, and the battery controller is configured to output a PWM signal having the first duty ratio to the switch driving circuit when at least one selected from a longitudinal acceleration magnitude of the longitudinal acceleration signal and a lateral acceleration magnitude of the lateral acceleration signal is greater than or equal to the second threshold value and less than the third threshold value.

11. A battery pack for a vehicle, the battery pack comprising:
 a battery;
 a switch coupled between the battery and an external terminal;
 a battery controller configured to receive an acceleration signal from the vehicle and to output a pulse width modulation (PWM) signal having a duty ratio according to an acceleration magnitude; and
 a switch driving circuit configured to generate a control current for controlling the switch based on the PWM signal,
 wherein the acceleration signal comprises a longitudinal acceleration signal and a lateral acceleration signal, and
 wherein the battery controller is configured to output a PWM signal having a first duty ratio to the switch driving circuit when at least one selected from a longitudinal acceleration magnitude of the longitudinal acceleration signal and a lateral acceleration magnitude of the lateral acceleration signal is greater than or equal to a first threshold value and less than a second threshold value.

12. A vehicle comprising: the battery pack of claim 11; and an electric motor to be actuated by electric energy stored in the battery, wherein the switch is coupled between the battery and the electric motor.

\* \* \* \* \*